Nov. 14, 1967             G. L. JACOX             3,353,150
FOAM-FILLED TRANSDUCER
Filed Oct. 22, 1965
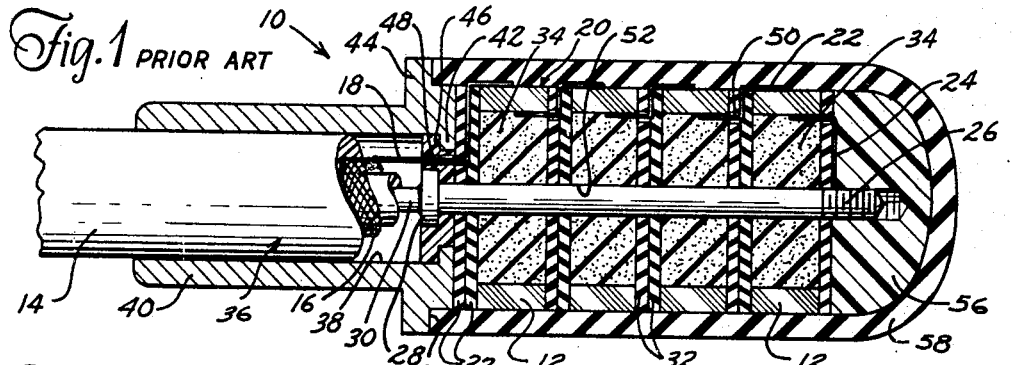
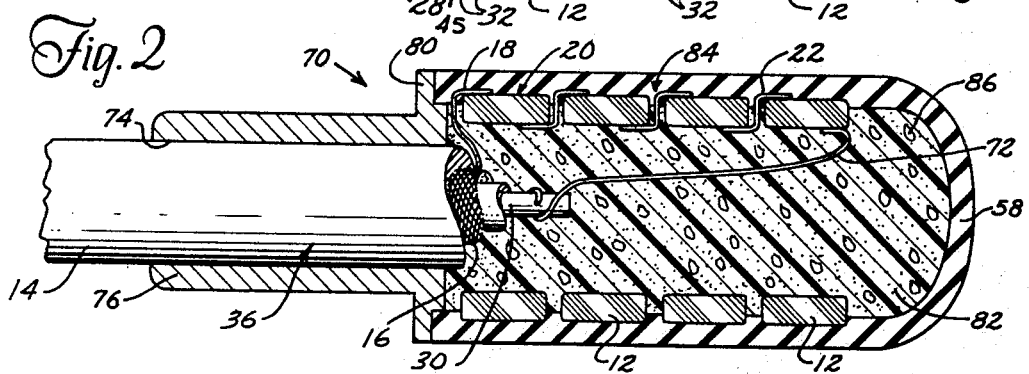
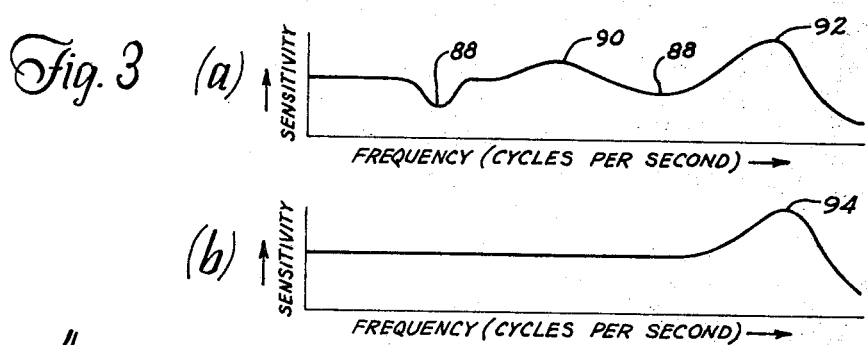
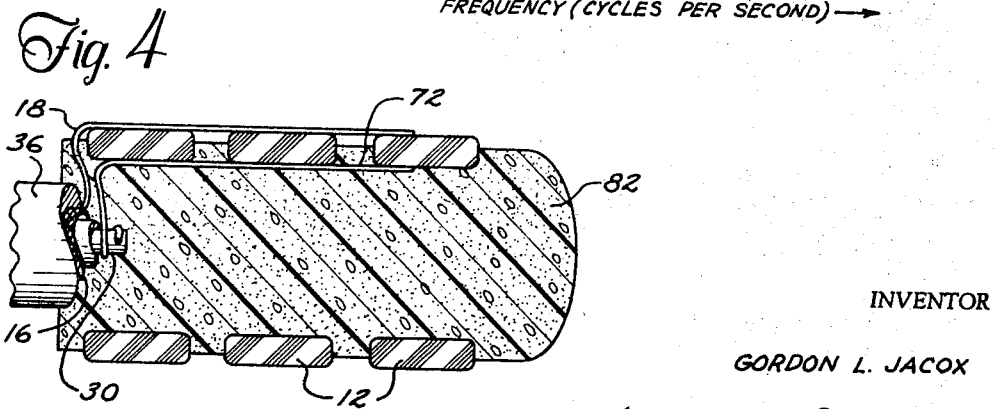
INVENTOR
GORDON L. JACOX
BY Tipton D. Jennings
ATTORNEY

United States Patent Office 3,353,150
Patented Nov. 14, 1967

3,353,150
FOAM-FILLED TRANSDUCER
Gordon Lee Jacox, Fairfax, Va., assignor to Atlantic Research Corporation, Fairfax, Va., a corporation of Virginia
Filed Oct. 22, 1965, Ser. No. 502,085
9 Claims. (Cl. 340—10)

This invention relates to transducers for converting electrical energy into compressional wave motion in a fluid medium and vice versa, and it relates to an improved method of manufacturing such transducers. More particularly, this invention relates to such transducers which utilize electromechanically responsive ceramic elements, also known a piezoelectric ceramic elements, and to a simplified method of manufacturing transducers using piezoelectric ceramic elements.

Transducers using piezoelectric ceramic elements are well-known in the art, and they find extensive use as projectors and as receivers, both in under-water and in airborne studies. Such transducers frequently use several elements which may be serially connected in an electrical circuit to give a transducer with increased voltage sensitivity, or which may be connected in parallel in an electrical circuit to reduce the susceptibility of the transducer to undesired noise signals. In such transducers it is necessary to mechanically isolate the several ceramic elements from each other and from the transducer base in order to improve the frequency response of the transducer. If the several ceramic elements are not mechanically isolated from each other and from the transducer base, they will tend to mechanically load each other, thereby adversely affecting the frequency response. It is also preferred that the elements be held rigidly within the transducer to prevent damage to the transducer under high pressure. Prior art transducers have been unable to fulfill both of these requirements satisfactorily, resulting in the necessity of having to compromise between them.

Piezoelectric ceramic elements produce an electrical output which is proportional to the mechanical stress to which the elements are subjected. Many transducers use annular ceramic elements which are more sensitive to hoop stress than to compressive stress. It is the practice to maximize the hoop stress while minimizing the compressive stress. With an annular element this is best accomplished by filling the internal bore of the element with a pressure absorbing material so that pressure will not be transmitted to the internal surface of the element. Prior art transducers having a plurality of annular elements employ a pressure-absorbing spacer within the bore of each element, requiring a large number of parts. Consequently, such transducers necessitate a long, laborious manufacturing process.

The present invention utilizes a foamed material within the transducer to accomplish the necessary functions of mechanically isolating adjacent elements, rigidly holding the elements within the transducer, and preventing the transfer of pressure to the internal surface of the annular elements. Since the material can be foamed around the transducer elements, and since it replaces the several other parts which heretofore were necessary to fulfill these functions, the manufacturing process is greatly simplified.

Accordingly, an object of the present invention is to provide an improved transducer utilizing ceramic elements and having optimum mechanical isolation among the elements and between the elements and the transducer case, while rigidly holding the elements within the transducer.

Another object is to provide a piezoelectric transducer having an improved frequency response.

A further object of this invention is to provide an improved piezoelectric transducer which utilizes annular ceramic elements and which has fewer parts than prior art transducers and therefore can be manufactured by a simplified technique.

Another object of this invention is to provide an improved method of manufacturing piezoelectric transducers.

A still further object is to provide a simplified, rapid technique for manufacturing piezoelectric transducers.

These and other objects and advantages are achieved in the subject invention which is more fully described in the following detailed description, taken in conjunction with the accompanying drawing, in which like parts are designated by like numerals. In the drawing:

FIGURE 1 is a longitudinal sectional view of a typical prior art transducer having a plurality of axially-aligned annular ceramic elements;

FIGURE 2 is a longitudinal sectional view of a transducer incorporating the subject invention;

FIGURE 3 depicts frequency-response curves of a typical prior art transducer and of a transducer manufactured in accordance with this invention;

FIGURE 4 is a longitudinal sectional view of a partial showing of an improved transducer incorporating the present invention having its ceramic elements electrically connected in parallel.

FIGURE 1 depicts a typical prior art transducer 10. Four piezoelectric ceramic elements 12, in the form of annular rings, are shown; however, any number of elements might be used. The four elements 12 are connected in a series electrical circuit with the coaxial cable 14. Commencing at the shield 16 within the cable 14, flexible lead 18 is connected to the outer surface 20 of the first or innermost ceramic element 12. A flexible lead 22 connects the inner surface of each element 12 to the outer surface of the next element. Flexible lead 24 connects the inner surface of the last or outermost ceramic element 12 to the shaft of the bolt 26 which passes through the center of the transducer 10. The head 28 of bolt 26 is electrically connected to the center conductor 30 of coaxial cable 14. The outer surface and the inner surface of each of the annular ceramic elements 12 is coated with an electrically conductive material to provide a surface for collecting the generated charge and to permit electrical connections to be made. On each side of each ceramic element there is located a resilient electrically insulating washer 32; thus, two washers 32 are located between adjacent elements 12. The center bore of each annular element 12 contains a spacer 34 made of a sponge rubber material.

The end 36 of coaxial cable 14 is located within a longitudinal opening 38 formed in the base 40 of the transducer 10. A flange 42 extends inwardly at the front end of the base 40. A second flange 44 extends outwardly near this front end, forming a shoulder 45. An insulating bushing 46 is positioned in the opening 38 against the flange 42. An additional resilient washer 32 is positioned between the ceramic element 12 and the front end of the base 40. An opening 48 is provided through bushing 46 and this additional washer 32 so that the flexible lead 18 can pass from the shield 16 of coaxial cable 14 between the washers 32 and then to the outer surface 20 of the first ceramic element 12. Similarly, each lead 22 passes through an opening 50 in one washer 32 and then between adjacent washers 32 to reach the outer surface of the next ceramic element 12. The insulating washers 32 insure that the leads 18 and 22 are electrically insulated from the elements 12 except at their contact point and from the base 40.

The bushing 46, the washers 32, and the spacers 34 all have a central opening 52 through which the bolt 26 passes. The bolt 26 terminates in a threaded connection with tip 56. The tip 56 is made of a water-impervious, electrically insulating material. A cover or boot 58, made of a material which transmits the compressional wave motion covers the outer surface of the tip 56, the washers 32, and the elements 12, and terminates at the forward shoulder 45 where it is bonded to the base 40.

It will be appreciated that due to the large number of pieces making up the transducer 10, the manufacturing process is long and laborious. The washers 32 must be aligned so that their openings 48 and 50 are properly positioned for the leads 18 and 22 to pass therethrough; the spacers 34, with the elements 12 fitted over them, must be properly positioned on the bolt 26. The leads must be carefully protected during the assembly process to insure that they are not damaged. The tip 56 then must be screwed onto the bolt 26. When this sub-assembly is completed, it is coated with a primer and placed into a mold with a quantity of raw rubber, and heat and pressure are applied to form the raw rubber into boot 58.

It will also be appreciated that during assembly as the tip 56 is tightened onto bolt 26 to give adequate rigidity to the transducer 10, the resilient washers 32 between adjacent elements 12 will be compressed, resulting in a loss of resiliency and thereby a reduction in their ability to mechanically isolate the elements. The ability of the elements 12 to vibrate independently of each other and independently of base 40 is substantially reduced. As a consequence, the frequency response is not substantially uniform out to the resonant frequency; instead, the response curve includes peaks and valleys causing large variations in sensitivity over the response range.

FIGURE 2 depicts a transducer similar in external appearance to the prior art transducer shown in FIGURE 1 but incorporating the distinctive subject invention. The transducer 70 again has a plurality of annular ceramic elements 12 which are serially connected in an electrical circuit with coaxial cable 14. The shield 16 within the cable 14 is connected by means of flexible lead 18 to the outer surface 20 of the first or innermost ceramic element 12. The inner surface of each ceramic element 12 is connected to the outer surface of the next ceramic element by means of a flexible lead 22. The inner surface of the last or outermost ceramic element 12 is connected by means of flexible lead 72 to the center conductor 30 of coaxial cable 14. The end 36 of coaxial cable 14 is placed within opening 74 in base 76. The base again terminates in an outwardly extending flange 80. A rubber boot 58 surrounds the ceramic elements and seals the transducer 70 at the front shoulder of flange 80.

The remaining space within the boot 58 is filled with a foamed core 82. This foamed core 82 not only eliminates the requirement for an abundance of parts within boot 58, such as shown in FIGURE 1, but also significantly improves transducer performance. The foam contains numerous pockets of entrapped gas, such as the gas bubbles depicted at 86, and accordingly it damps out or absorbs the vibrations of each ceramic element 12 before these vibrations reach other elements 12 or the base 76. As a result, each element is mechanically isolated in that it is not influenced by the mass of adjacent elements or the mass of the transducer base 76.

It has been found that this mechanical isolation improves frequency response in comparison with the prior art transducers. FIGURE 3a depicts a frequency response curve for a typical prior art transducer, such as that shown in FIGURE 1. It can be seen that the curve is not flat out to the resonant frequency. Instead, valleys 88 and peak 90 occur before the resonant frequency peak 92. These deviations are caused by the resonance of the transducer base 38 and the combined resonance of the several transducer elements when not mechanically isolated from each other. In contrast, the frequency response curve of the transducer of FIGURE 2 is shown in FIGURE 3b. It will be noted that this curve is substantially flat out to the resonant frequency peak 94. This improved frequency response enhances the value of the transducer as a projector and as a receiver, both in underwater work and in airborne work.

The numerous gas pockets 86 within the foamed core 82 also enable the core to absorb the compressional waves which impinge upon it, rather than transferring them to the internal surfaces of the annular ceramic elements 12. Accordingly, the elements 12 are subjected primarily to hoop stress, rather than to compressive stress. In addition, since the core 82 fills the openings 84 between the adjacent elements 12, it electrically insulates the wires 22 as they interconnect the elements 12; thus, it is not necessary to have special insulating means, as is required in the prior art.

The process for manufacturing this improved transducer 70 is substantially simplified over that required for the prior art transducer. The coaxial cable 14 is slipped within opening 74 in base 76 and the base and the ceramic elements 12 are placed within a suitable mold. The flexible leads 18, 22, and 72 are soldered in place. Then the mold is closed, and the required quantity of foam ingredients is introduced into the interior of the mold. Within a matter of minutes the polymerization ingredients have foamed into a rigid core, forming a subassembly which can be removed from the mold. After cleaning and coating with a primer, this subassembly is placed into a second mold with raw rubber, and heat and pressure are applied to form the rubber into the boot 58, just as with the prior art transducer. The step of molding boot 58 is preferred because it insures close adhesion of the boot 58 to the outer surface of each element 12, avoiding the forming of any bubbles at the outer surface which would absorb rather than transmit pressure to an element 12. The numerous manual steps required in the prior art to form a subassembly, about which boot 58 is molded, are eliminated in the manufacture of the transducer incorporating the subject invention and are replaced by the aforedescribed, simplified molding operation. The two-step molding process can of course be modified to an equivalent process in which the rubber cover is first molded about the ceramic rings, using a mold with both female and male sections, and then removing the male section and introducing the foam-forming ingredients into the cavity remaining.

Numerous cellular or foamed materials can be utilized to form a rigid core 82. Examples of these are foamed glasses, foamed ceramics, and foamed polymers such as the polyurethanes, silicone foams, foamed epoxies, and phenolic foams. The particular foamed material utilized will be dependent upon such factors as availability, cost, and the intended use of the transducer. In a transducer to be used as a microphone in airborne studies the rigid foam should have as low a density as possible in order to increase its sound pressure adsorption properties. A density as low as two pounds per cubic foot is capable of being used. In a hydrophone used under water it is necessary to use a rigid foam having sufficient compressive strength to withstand the static pressure encountered at the intended depth. Thus, a higher density foam may be necessary. A compressive strength of 50 p.s.i. has been found satisfactory for foams used to depth of 150 feet. Foamed materials having greater compressive strengths are of course usable to greater depths.

Numerous minor modifications can readily be made to the embodiment of FIGURE 2. As represented in the partial showing of FIGURE 4, the elements 12 can be electrically connected in parallel rather than in series, thereby reducing the sensitivity of the transducer. The flexible lead 18 connects the shield 16 of the coaxial cable 36 to the outer surface of each of the ceramic elements 12. The inner surface of each element 12 is connected by flexible lead 72 to the center conductor 30 of the coaxial cable. The remaining space within the boot (not shown) is again filled with a foamed material 82.

The ceramic elements can be shielded to prevent their being affected by extraneous electromagnetic radiation. This can be accomplished either by incorporating a wire mesh into the boot 58, or by first painting a coating of conductive rubber over the primer on the outer surface of the ceramic elements 12 and the core 82, before molding the rubber boot 58 in place. If the transducer will not be subjected to a great mechanical stress, the shaft of base 76 can be reduced or eliminated. This will decrease the mass loading of the transducer and thus further improve its frequency response. In the embodiment of FIGURE 2 the ceramic elements have been shown in axial alignment; however, they can be placed in the same plane. In some applications elements in the form of flat disks might be utilized, rather than annular rings.

Although this invention has been described with reference to illustrative embodiments thereof, it will be apparent to those skilled in the art that the principles of this invention can be embodied in other forms but within the scope of the claims.

What is claimed is:

1. A transducer comprising a base, a cover mounted to said base thereby forming an enclosed cavity, a plurality of electromechanically-responsive ceramic elements mounted in said cavity and in pressure-transmitting relation with said cover, a rigid foamed cellular material selectively located within said cavity for acoustically isolating said elements to improve the frequency response characteristics of said transducer, said material also absorbing unwanted compressional waves within said cavity, supporting said elements and lending rigidity to said transducer.

2. A transducer in accordance with claim 1 in which said elements are interconnected in parallel in an electrical circuit.

3. A transducer in accordance with claim 1 in which said elements are interconnected serially in an electrical circuit.

4. A transducer in accordance with claim 1 in which said transducer is elongated and said elements are aligned along the longitudinal axis of said transducer.

5. A transducer comprising a base, a cover mounted to said base thereby forming an enclosed cavity, a plurality of spaced, annular, electromechanically-responsive ceramic elements mounted within said cavity, a rigid foamed core formed within said cavity and filling the bore of said annular elements and the spaces between adjacent elements for acoustically isolating said elements to improve the frequency response characteristics of said transducer, said core serving to support said elements and lending rigidity to the transducer, and an electrical circuit interconnecting said elements.

6. A transducer in accordance with claim 5 in which said elements are in axial alignment.

7. In a transducer having a plurality of axially-aligned annular electromechanically-responsive ceramic elements enclosed by a cover of pressure-transmitting material in pressure-transmitting relation with said elements, said elements being incorporated in an electrical circuit for connection externally of said transducer, the improvement comprising a rigid foamed material filling the remaining space enclosed by said cover including the bore of said annular elements for acoustically isolating said elements to improve the frequency response characteristics of said transducer, said material being in supporting relation with said elements and lending rigidity to said transducer.

8. A transducer as in claim 7 in which said foamed material electrically insulates at least a portion of said electrical circuit.

9. A transducer comprising a base, a cover attached to said base and thereby forming an enclosed cavity, a plurality of annular, spaced, piezoelectric ceramic elements arranged in axial alignment within said cavity, means for connecting said elements in an electrical circuit, a rigid, foamed, cellular material filling the remaining space within said cavity including the space between the elements for acoustically isolating said elements by absorbing vibrations from each element when said transducer is operated, said material also serving to rigidly hold the elements within the transducer and prevent transfer of pressure to the inner surfaces of said annular elements.

References Cited
UNITED STATES PATENTS

| | | | |
|---|---|---|---|
| 2,947,969 | 8/1960 | Harris | 340—10 X |
| 3,153,694 | 10/1964 | Tomlinson | 264—272 X |
| 3,009,131 | 11/1961 | Woodworth | 340—17 |

RODNEY D. BENNETT, *Primary Examiner.*

CHESTER L. JUSTUS, *Examiner.*

B. L. RIBANDO, *Assistant Examiner.*